United States Patent
Marable et al.

(10) Patent No.: US 8,430,425 B2
(45) Date of Patent: Apr. 30, 2013

(54) AIRBAG ASSEMBLY

(75) Inventors: Paul Mark Marable, Rayleigh (GB);
Allen Charles Bosio, Basildon (GB);
Timothy Scott, Benfleet (GB)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 12/974,223

(22) Filed: Dec. 21, 2010

(65) Prior Publication Data

US 2011/0148080 A1    Jun. 23, 2011

(30) Foreign Application Priority Data

Dec. 22, 2009   (GB) .................................. 0922338.9

(51) Int. Cl.
*B60R 21/231* (2011.01)

(52) U.S. Cl.
USPC ........................................ 280/743.1; 280/732

(58) Field of Classification Search ............... 280/730.1, 280/731, 732, 743.1
See application file for complete search history.

(56) References Cited

U.S. PATENT DOCUMENTS

| | | | | |
|---|---|---|---|---|
| 5,240,283 A * | 8/1993 | Kishi et al. | ..................... | 280/729 |
| 5,934,701 A * | 8/1999 | Furukawa | ................... | 280/730.1 |
| 6,042,147 A * | 3/2000 | Nishijima et al. | ......... | 280/743.1 |
| 6,540,254 B2 * | 4/2003 | Bieber et al. | .................. | 280/732 |
| 6,554,313 B2 * | 4/2003 | Uchida | .......................... | 280/729 |
| 6,883,832 B2 * | 4/2005 | Keutz | .......................... | 280/743.2 |
| 6,913,283 B2 * | 7/2005 | Heym | ........................... | 280/732 |
| 7,441,805 B2 * | 10/2008 | Jamison et al. | ............ | 280/743.2 |
| 7,914,038 B2 * | 3/2011 | Koyama et al. | ............ | 280/730.1 |
| 2002/0113416 A1 | 8/2002 | Uchida | | |
| 2007/0187932 A1 | 8/2007 | Sekizuka | | |
| 2007/0205591 A1 * | 9/2007 | Bito | ........................... | 280/743.2 |
| 2008/0048420 A1 | 2/2008 | Washino | | |
| 2011/0018240 A1 * | 1/2011 | Marable et al. | ............ | 280/728.3 |

FOREIGN PATENT DOCUMENTS

| | | | |
|---|---|---|---|
| EP | 0847905 A1 | | 6/1998 |
| GB | 1362672 A | * | 8/1974 |
| GB | 1420226 | | 1/1976 |
| JP | 2005206067 A | | 8/2005 |

OTHER PUBLICATIONS

Intellectual Property Office, Search Report for the corresponding GB Patent Application No. GB0922338.9 mailed Apr. 15, 2010.

* cited by examiner

*Primary Examiner* — Faye M Fleming
*Assistant Examiner* — James English
(74) *Attorney, Agent, or Firm* — Frank A. MacKenzie; Brooks Kushman P.C.

(57) ABSTRACT

An airbag assembly for a motor vehicle has an airbag 10 that is inflated by an inflator 12 when the airbag 10 is deployed in accordance with a control signal from an electronic controller 6. A portion of the airbag 10 in a region where an expected head impact with the airbag 10 will occur is formed by a soft panel portion 25 which provides a softer or more compliant structure that can expand or stretch to an increased surface area condition to thereby reduce the risk of injury to an occupant. The soft panel portion 25 is constructed so as to provide increased give or stretch relative to the other parts of the fabric bag 9 when a head of an occupant impacts against it.

14 Claims, 4 Drawing Sheets

AIRBAG ASSEMBLY

CROSS-REFERENCE TO RELATED APPLICATIONS

This application claims foreign priority benefits under 35 U.S.C. §119 (a)-(d) to GB 0922338.9 filed Dec. 22, 2009, which is hereby incorporated by reference in its entirety.

BACKGROUND

1. Technical Field

This invention relates to an occupant protection airbag assembly for a motor vehicle.

2. Background Art

It is known that the use of an airbag may aid in reducing injury to an occupant of a vehicle in the event of a serious collision.

In the design of airbag systems, it is recognized that to provide the necessary amount of cushioning for a relatively large and heavy occupant the airbag must be relatively taut when inflated. This tension may, however, have a significant effect on the compliance or softness of the airbag particularly with respect to a head impact against the airbag. It would be desirable to provide an airbag assembly that is economical to manufacture and improves the compliance of the airbag when impacted against by a head of an occupant.

SUMMARY

According to a first disclosed embodiment, an airbag comprising a chamber defined by a fabric bag having at least one main vent to vent gas from the chamber to atmosphere wherein the fabric bag includes an extendible portion in a region of the fabric bag where a head impact with the bag is predicted to occur.

The fabric bag may be made from one of a gas impermeable and a low permeable fabric.

The extendible portion may be constructed so as to permit it to extend a significant amount when impacted against by a head of an occupant so as to reduce local surface tension and thereby provide improved head protection.

The extendible portion of the fabric bag may be constructed so as to extend at least twice as much as would be the case if the other parts of the fabric bag where to be impacted against by a head with the same force.

The extendible portion may include one or more pleats formed by folding the sheet from which the extendible portion is constructed back on itself and securing in the folded position by one or more frangible stitches.

The extendible portion may be formed by a separate panel formed from a material of reduced resistance to extension relative to the material from which other parts of the fabric bag are constructed.

A peripheral edge of the extendible portion may be reinforced by a stiffening frame.

A peripheral edge of the extendible portion may be reinforced by the use of a number of tethers located within the fabric bag.

The fabric bag may define a main chamber having at least one main vent and a subsidiary chamber fluidly connected to the main chamber by at least one transfer vent formed in a common wall between the respective subsidiary chamber and the main chamber wherein a part of the fabric bag defining an occupant facing wall of the subsidiary chamber may be formed with the extendible portion.

The airbag may have a main wall fastened on each longitudinal edge to a respective side wall and at least one tether is connected to the main wall to form a depression in the main wall when the airbag is deployed corresponding to the location of the subsidiary chamber wherein a cover is attached to the main wall and the two side walls to cover the depression so as to form the respective subsidiary chamber and to form the extendible portion of the airbag.

Each cover member may be sealingly attached around its periphery to the main wall and the two side walls by stitching it in place.

The subsidiary chamber may have at least one subsidiary vent to vent gas from the respective chamber to atmosphere.

BRIEF DESCRIPTION OF THE DRAWINGS

The disclosed embodiment will now be described by way of example with reference to the accompanying drawing of which.

DETAILED DESCRIPTION

Figure 1:
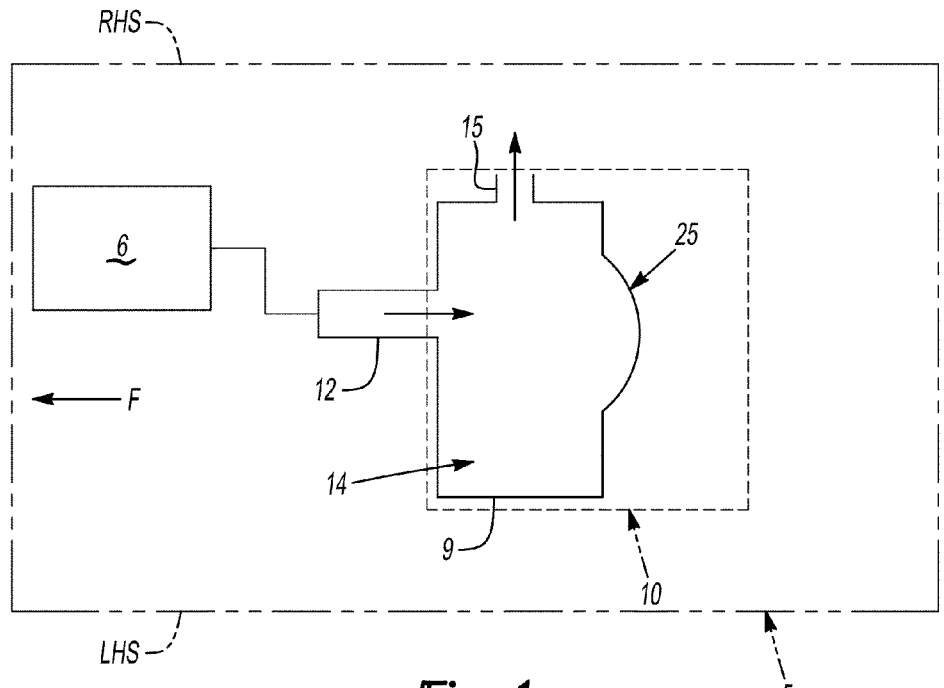
FIG. 1 is a block diagram of a motor vehicle having an airbag assembly according to the disclosed embodiment.

With reference to FIG. 1 a motor vehicle 5 has a left hand side LHS, a right hand side RHS and a front indicated by the arrow "F". The motor vehicle 5 has an electronic controller 6 that may perform many tasks but in this case is used to determine when an airbag 10 forming part of an airbag assembly needs to be deployed.

The airbag assembly comprises the airbag 10 and an inflator 12 which is used to provide gas to inflate the airbag 10 thereby deploying it.

The airbag 10 has, in the shown embodiment, a single chamber 14 defined by a bag 9 formed from a low permeable or impermeable fabric. Airbag 10 includes an extendible portion in the form of a soft panel portion 25.

The chamber 14 has a main vent 15 to limit the maximum pressure in the chamber 14 and to allow gas to escape to atmosphere at the end of the inflation process so as to provide a controlled collapse of the chamber 14 that can be used to absorb energy from an impacting occupant.

Although a single main vent 15 is shown in the right hand side of the main chamber it will be appreciated that there could also be a vent on the left hand side or there could be vents on both sides of the main chamber or in other locations where the gas can be safely emitted without risking direct impingement against an occupant of the vehicle. It will also be appreciated that although the main vent is shown as a single aperture each main vent could be formed by a number of separate apertures that in combination have the required cross-sectional area, or the fabric used to construct the airbag could be of a gas porous nature such that gas can escape from the airbag 10 at a desired rate.

As is described hereinafter the soft panel portion 25 can be constructed in many ways but in each case the soft panel portion 25 provides an area of the airbag 10 that can extend or stretch to an increased surface area condition. The soft panel portion 25 is located on the airbag 10 so as to be positioned in an expected head impact zone of the airbag 10. That is to say the soft panel portion 25 is positioned so as to be struck by and absorb energy from the head of an occupant impacting against the airbag 10 and in particular the head of an adult of small stature such as, for example, a $5^{th}$ percentile female occupant.

Figure 2:
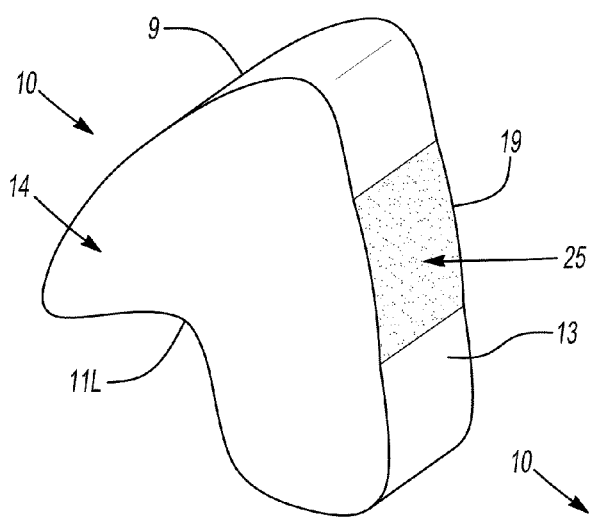
FIG. 2 is a pictorial representation of a first embodiment of an airbag according to the disclosed embodiment showing the airbag in an inflated state.

Referring now to FIG. 2 there is shown in greater detail an airbag 10. The bag 9 is formed from two side panels (a left side panel 11L and a right side panel that is not visible) and a front panel 13 which are joined together by, in this case, stitching the edges of the respective fabric parts together. The soft panel portion 25 is a sheet of material attached to the front panel 13 so as to overlie an aperture in the fabric from which the front panel 13 is made. The soft panel portion 25 is made from a material that is by its nature more extendible when subjected to a predetermined load than the material normally used, or is woven so as to permit significantly more extension when subjected to a predetermined load than the material from which other parts of the bag 9 are made. That is to say the soft panel portion has less resistance to a tensile load than the other material from which the bag 9 is constructed, so that it is able to extend to an increased surface area condition when subjected to impact.

In order to stabilise the soft panel portion 25 a peripheral reinforcing frame 19 surrounds the soft panel portion 25. The reinforcing frame 19 in this case is made by folding the edge of the sheet forming the soft panel 25 back on itself before stitching it to the front panel 13 but it will be appreciated that other means for reinforcing the periphery of the soft panel portion 25 could be used.

When the airbag 10 is deployed the soft panel portion 25 will balloon out from the surrounding front panel 13, thereby providing an earlier contact with a head and restraining it earlier in a crash event, but more importantly, when a head of an occupant impinges upon the soft panel portion 25 the soft panel is able to stretch to an increased surface area condition thereby reducing the resistance to impact of the head and improving the impact absorbing properties of the airbag 10.

Figure 3:
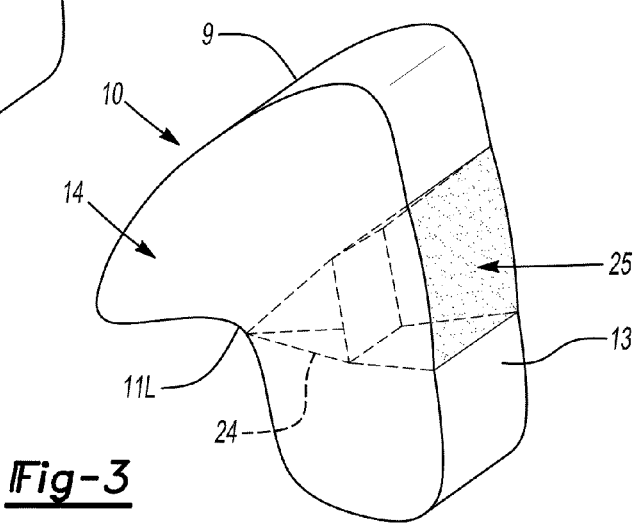
FIG. 3 is a pictorial representation of a second embodiment of an airbag according to the disclosed embodiment showing the airbag in an inflated state.

Referring now to FIG. 3 there is shown an airbag 10 that is in most respects the same as that shown in FIG. 2 and so will not be described again so far as common features exist.

The only significant difference between the two airbags 10 shown in FIGS. 2 and 3 is that that the airbag 10 shown in FIG. 3 has no reinforcing frame 19 and instead a number of internal tethers 24 are used to provide the peripheral stability for the soft panel portion 25.

As before, the soft panel portion 25 is attached to the front panel 13 so as to overlie an aperture in the fabric from which the front panel 13 is made and is made from a material that is constructed so as to permit significantly more extension when subjected to a predetermined load than the material from which other parts of the bag 9 are made.

As described with reference to FIG. 2, when the airbag 10 is deployed the soft panel portion 25 may balloon outwardly from the surrounding front panel 13 to assume an increased surface area condition and contact a head earlier, thereby providing earlier restraint of the head in the event of a crash, and is able to stretch when a head of an occupant impinges upon the soft panel portion 25 thereby reducing the resistance to impact of the head and improving the impact absorbing properties of the airbag 10.

Figure 4:
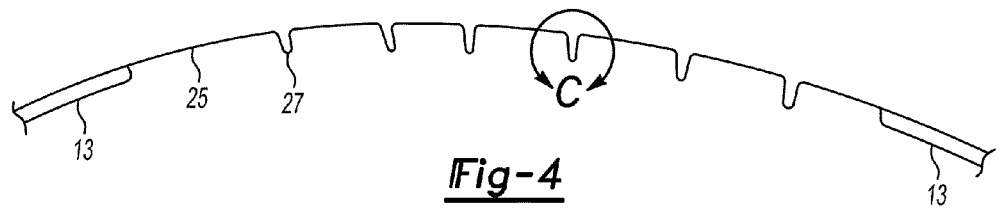
FIG. 4 is a cross-section through one embodiment of an extendible panel forming part of an airbag according to the disclosed embodiment.
Figure 5:
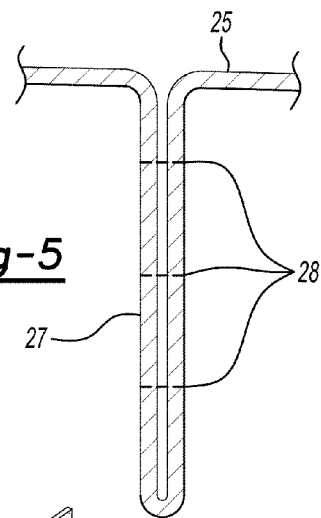
FIG. 5 is an enlarged view of the area 'C' circled on FIG. 4.

Referring now to FIGS. 4 and 5 there is shown an alternative construction of soft panel that could be used to replace the stretchy or extendible material previously described with reference to FIGS. 2 and 3.

The soft panel 25 has a number of pleats or ribs 27 formed in it by folding the sheet from which the soft panel 25 is formed back on itself and sewing it together in one or more places as indicated by the stitching 28 on FIG. 5. The panel 25 is, in the example shown, stitched around its periphery to the front panel 13 but it will be appreciated that the material of the front panel 13 could itself be formed with the pleats or ribs 27 so that the soft panel portion 25 would be an integral part of the front panel 13.

Unlike the previously described embodiments using stretchy fabric, when the airbag 10 is deployed the soft panel portion 25 will not necessarily balloon out compared to the surrounding front panel 13 because it is made from a sheet that is not significantly more extensible than the material from which the front panel 13 is made. However, the soft panel portion 25 is able to extend to an increased surface area condition when a head of an occupant impinges upon the soft panel portion 25 because the effect of a head impinging against the soft panel portion 25 causes the stitches 28 to be broken thereby releasing extra material. The effect of this is to reduce the resistance to impact of the head thereby improving the impact absorbing properties of the airbag 10. It will be appreciated that, if required, the soft panel portion 25 could also be made from a material that, as in the previously described embodiments, stretches or extends more for a given tensile load than the fabric from which the front panel 13 is constructed.

Figure 6A:
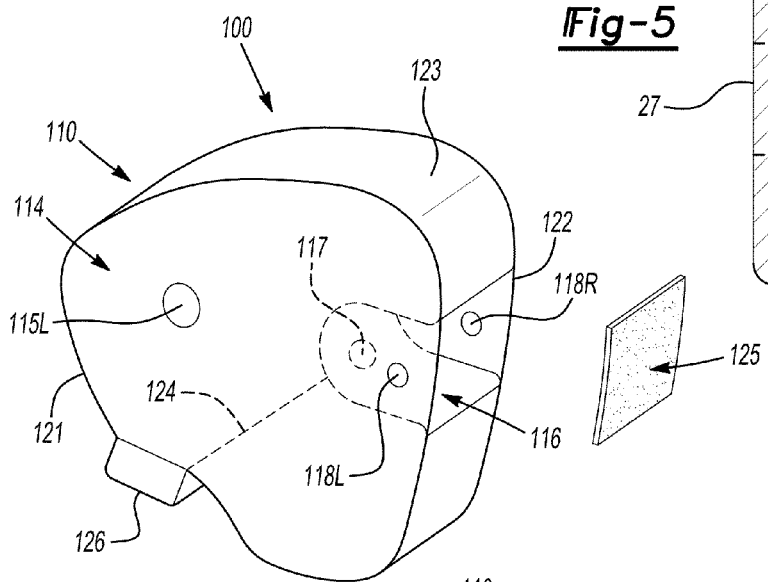
FIG. 6a is a pictorial view of a third embodiment of an airbag according to the disclosed embodiment in a partly assembled state with an extendible panel forming part of the airbag removed.
Figure 6B:
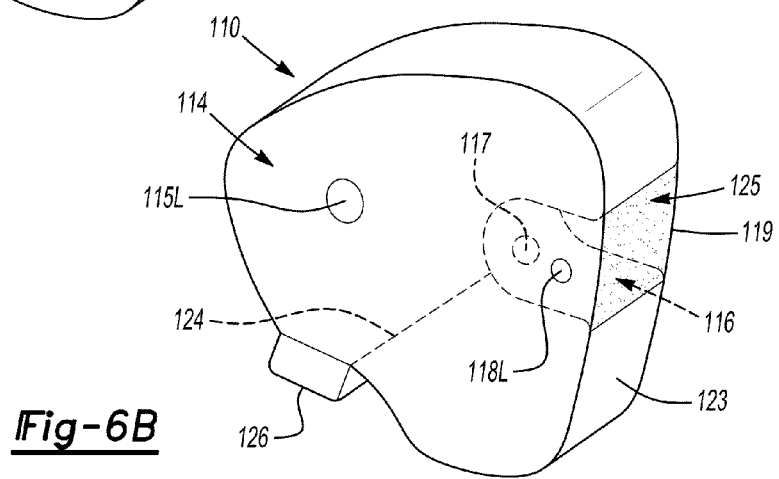
FIG. 6b is a view corresponding to the view shown in FIG. 6a showing the airbag in a fully assembled state.

Referring now to FIGS. 6a and 6b there is shown an alternative embodiment of the disclosed embodiment in which an airbag assembly 100 has an airbag 110 and a reactor can 126 which houses an inflator (not shown). The airbag 110 is secured to the reactor can 126 and the reactor can 126 is secured in use to a structural part of a motor vehicle such as the motor vehicle 5 shown in FIG. 1.

The airbag 110 has a main or front wall 123 made from a sheet of coated gas impermeable fabric fastened on each longitudinal edge to a respective side wall 121, 122. Each of the side walls 121, 122 is made from a sheet of coated gas impermeable fabric and is sealingly fastened to the main wall 123 by stitching. The main wall 123 in combination with the left and right side walls 121 and 122 forms a main chamber 114 of the airbag 110. It will be appreciated that the main wall 123 and the two side walls 121, 122 could each be made from more than one sheet of fabric.

An internal tether 124 is connected at one end to the reaction can 126 and at an opposite end to the main wall 123 to form a depression in an occupant-facing part of the main wall 123 when the airbag 110 is deployed. It will be appreciated that each depression may be formed by the use of more than one tether and that in other embodiments more than one depression may be formed.

A soft panel cover member 125 extends over the depression and is attached to the main wall 123 and/or side walls 121, 122 to form a subsidiary chamber 116 that is separated from the main chamber 114 by the main wall 123 which forms a common wall between the main and subsidiary chambers 114 and 116. The depression therefore corresponds to the location of the subsidiary chamber 116.

At least a portion of the cover member 125 forms an extendible portion of the airbag 110 and is made from a sheet of material (such as coated gas impermeable fabric) that is significantly more extendible than the material from which the main wall 123 is constructed. For example, when subject to tensile loads commonly encountered in deployed passenger airbags the cover member 125 will preferably extend at least twice as much as the other material from which the airbag 110 is constructed. The cover member 125 is sealingly attached around its periphery to the main wall 123 and to the left and right hand side walls 121 and 122, for example by stitching, so as to cover the depression and form the subsidiary chamber 116. The peripheral edges of the cover member 125 may be turned back on themselves before securing the cover member 125 so as to produce a reinforcing frame 119 around the periphery of the cover panel 125.

An aperture 117 is formed in the main wall 123 in the region of the depression to form a transfer vent between the main chamber 114 and the subsidiary chamber 116.

The left hand side wall 121 has a first aperture 115L in it to form a main vent for the main chamber 114 and in this case a second aperture 118L within the region of the depression to form a subsidiary vent for the subsidiary chamber 116. Likewise, the right hand side wall 122 may also (or alternatively) have an aperture (not shown in FIG. 2a or 2b) in it to form a further main vent for the main chamber 114, in this case a second aperture within the region of the depression to form a subsidiary vent for the subsidiary chamber 116.

It will be appreciated that although the subsidiary vents are advantageous in certain respects it would be possible to construct a two chamber airbag having only the main vents 115L and 115R and that this embodiment of the invention is not limited to the use of a two chamber airbag having subsidiary vents.

When the airbag 110 is deployed, the main chamber 114 fills rapidly with gas from the inflator and the pressure in the main chamber 114 rises rapidly because the flow of gas into the main chamber 114 is greater than the flow out via the two main vents 115L and 115R. In addition, at least during an initial stage of inflation, the two main vents 115L and 115R are obstructed by the folded nature of the airbag 110 and so no gas can escape from the main chamber 114 through either of the main vents 115L and 115R until the airbag 110 is at least partially deployed.

As the main chamber 114 begins to fill with gas the transfer vent 117 becomes uncovered by the unfolding of the airbag 110 and gas then begins to flow into the subsidiary chamber 116. Pressures within the subsidiary chamber 116 are always the same as or lower than the pressure in the main chamber 114 and the subsidiary chamber 116 fills more slowly than the main chamber 114 due to the restrictive nature of the transfer vent 117.

Eventually the airbag 110 reaches a fully deployed state as shown in FIG. 6b which ideally occurs just prior to the time that a correctly seated and belted occupant would be expected to impact against the airbag 110. In this state the cover member 125 balloons out slightly due to its more extendible nature. As referred to previously, when a head of an adult occupant of small stature (such as a $5^{th}$ percentile female occupant) impinges upon the cover portion 125 it is able to stretch to an increased surface area condition, thereby reducing the resistance to impact of the head and improving the impact absorbing properties of the airbag 10.

A further advantage of this embodiment is that, in the event of an out-of-position occupant such as an occupant sitting too close to the airbag 110 which will result in contact occurring while the airbag 110 is still inflating, then the presence of the subsidiary airbag 116 may reduce the impact force due to the fact that the subsidiary chamber 116 will be at a lower pressure than the main chamber 114 and also due to the fact that the subsidiary chamber 116 is not expanding so rapidly as the main chamber 114.

It will be appreciated that instead of using fabric that is more extendible due to its construction or the material used for its construction, it would be possible to use the same material as used for the construction of the main panel and side walls 123 and 121, 122 and incorporate pleats such as those shown in FIGS. 4 and 5.

Although two methods of obtaining an extendible soft panel are described above, namely the use of a more stretchable fabric and the use of pleats, it will be appreciated that the invention is not limited to these embodiments and that other arrangements that permit the soft panel material to extend to an increased surface area condition when impacted against by a head of an occupant so as to reduce tension in the fabric and produce a softer impact for the occupant while containing gas within one or more chambers could be used.

Figure 7A:
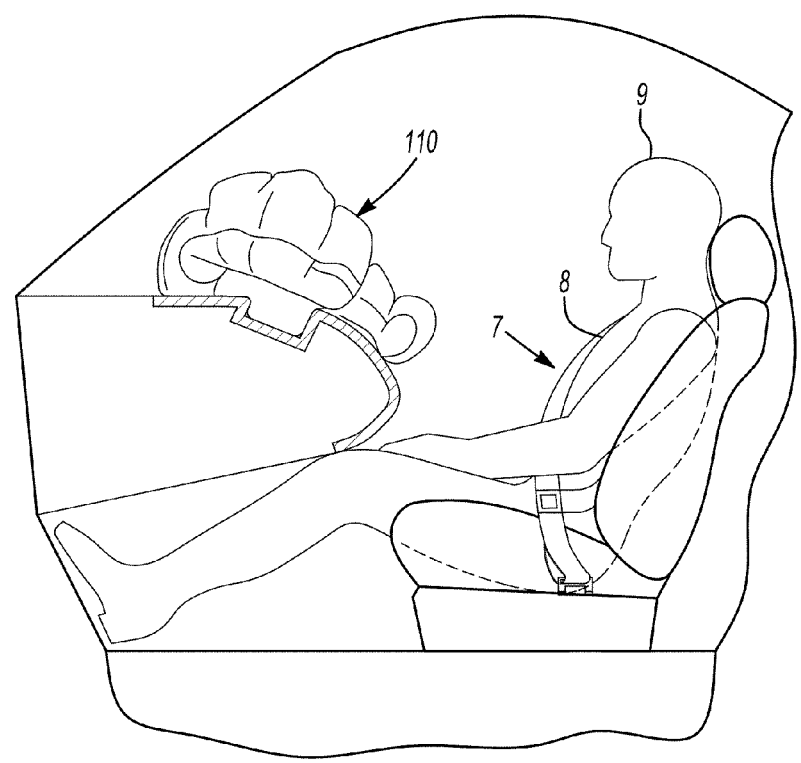
FIG. 7a is a side view of a vehicle having an airbag of the type shown in FIGS. 6a and 6b as the airbag begins to deploy.
Figure 7B:
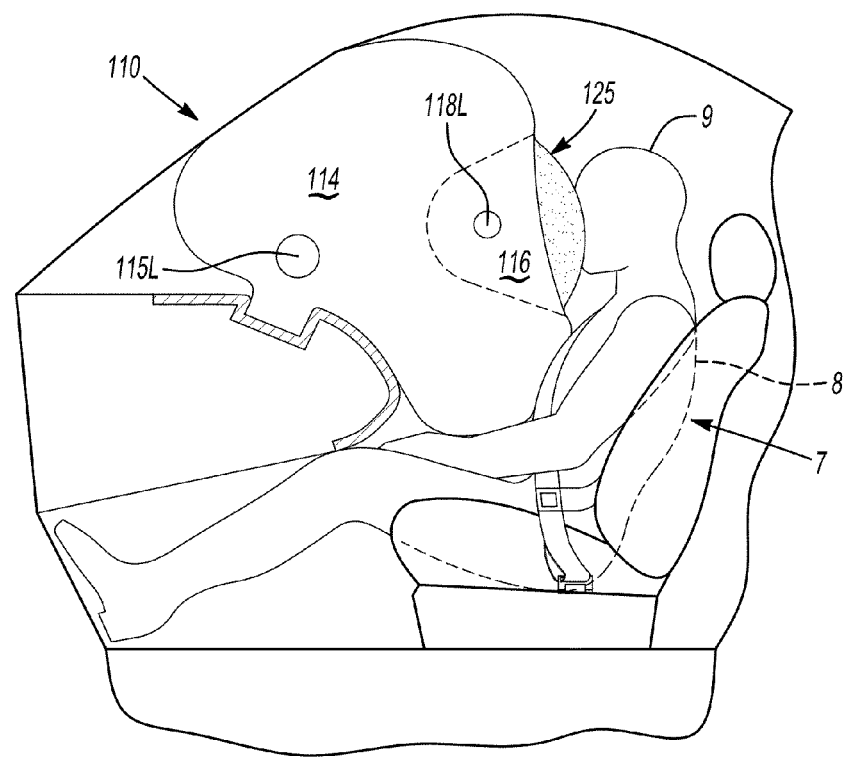
FIG. 7b is a side view of a vehicle having an airbag of the type shown in FIGS. 6a and 6b when the airbag is deployed and an occupant in this case a $5^{th}$ percentile female is impacting against the airbag.

With reference to FIGS. 7a and 7b there is shown an occupant 7 having an abdomen 8 and a head 9. FIG. 7a shows the situation when the airbag 110 begins to deploy and FIG. 7b shows the impact position for the occupant 7 (in this case a crash dummy simulating a $5^{th}$ percentile female occupant). The airbag 110 is substantially similar to that shown in FIGS. 6a and 6b.

It can be seen in FIG. 7b that the soft cover member 125 is positioned so as to be in a head impact zone thereby providing improved impact conditions for the head 9 of the occupant 7 due to the lower tension in the fabric of the cover panel 125.

Figure 8:
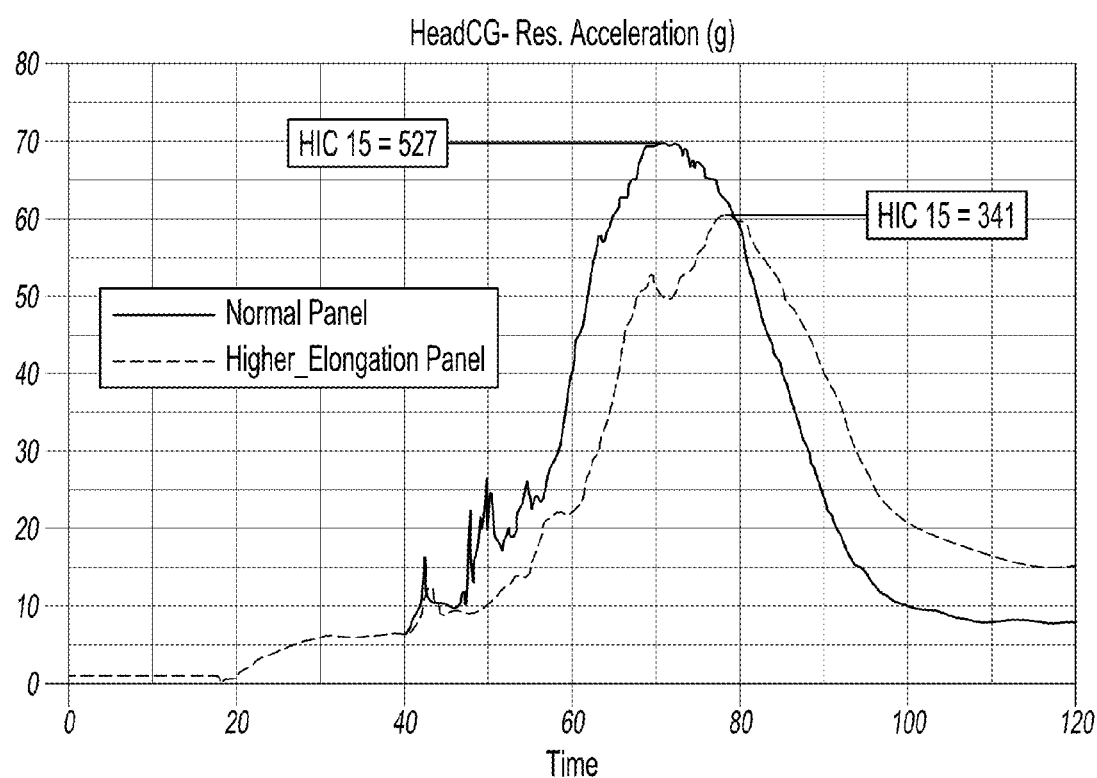
FIG. 8 is a chart showing acceleration versus time for a prior art airbag and for an airbag constructed in accordance with this disclosed embodiment.

FIG. 8 shows the results from tests carried out on an airbag 110 of the type shown in FIGS. 6a to 7b. It will be noted that for an airbag constructed with a conventional cover member the peak deceleration is 70 G and the resulting HIC 15 value is 527, whereas for an identical airbag having a soft cover member 125 with increased extendibility the peak deceleration is 61 G and the resulting HIC 15 value is 341. It will be appreciated that a reduction in HIC 15 of 35% is likely to be significant in the reduction of risk of injury to an occupant. It is an advantage of the invention that such a significant improvement can be made in an extremely cost effective manner by replacing the relatively inextensible material from which a conventional cover was made with a material having considerably increased extendibility.

Therefore in summary, US crash requirements require differing passenger airbag cushioning levels between large and small stature occupants who could be belted or unbelted and in particular require a fine balance between head and neck injuries for small stature occupants such as $5^{th}$ percentile female occupants. An airbag cushion according to the prior art only allows a uniform surface tension because the cushion has a regular form with constrained gas supply and venting. To protect a large stature unbelted occupant (such as a $50^{th}$ percentile male occupant) the cushion requires a specific pressure that is sufficient to restrain the uncoupled body mass. This pressure may be higher than is optimum when applied to a belted small stature occupant such as a $5^{th}$ percentile female occupant. The disclosed solution to this problem provides a lateral patch across a front surface of the cushion set at a specific height where the head of a small stature occupant such as a 5$^{th}$ percentile female occupant is likely to make contact. For a larger stature occupant (such as a 50$^{th}$ percentile male occupant) the lateral patch will make contact with the upper chest thus having a minimal effect on the flexible body regions. The lateral patch has the capacity to enlarge or extend locally thus reducing the surface tension of the cushion specific to the impact point of the small stature occupants head.

It will be appreciated by those skilled in the art that although the invention has been described by way of example with reference to one or more embodiments, it is not limited to the disclosed embodiments and that one or more modifications to the disclosed embodiments or alternative embodiments could be constructed without departing from the scope of the invention as set out in the appended claims.

What is claimed:

1. An airbag for a motor vehicle comprising:
   a left side wall and a right side wall;
   a main wall fastened along opposite longitudinal edges to the left and right side walls;
   a tether connected to the main wall to form a depression in the main wall when the airbag is deployed;
   a cover attached to the main wall and the left and right side walls to cover the depression so as to form a subsidiary chamber, at least a portion of the cover comprising an extendible portion in a region of the airbag where an occupant head is expected to impact the airbag, the extendible portion extending to an increased surface area condition when subjected to impact; and
   at least one subsidiary vent to vent gas from the subsidiary chamber to atmosphere.

2. The apparatus according to claim 1 wherein the extendible portion comprises a sheet folded to form one or more pleats, the pleats secured with one or more frangible stitches.

3. The apparatus according to claim 1 wherein the extendible portion is formed by a separate panel formed from a material of reduced resistance to extension relative to the material from which other parts of the airbag are constructed.

4. The apparatus according to claim 1 wherein a peripheral edge of the extendible portion is reinforced by a stiffening frame.

5. The apparatus according to claim 1 wherein the airbag defines a main chamber having the main vent and a subsidiary chamber fluidly connected to the main chamber by at least one transfer vent formed in a common wall between the subsidiary chamber and the main chamber.

6. An airbag for a motor vehicle comprising:
   an extendible portion in a region of the airbag where an occupant head is expected to impact, the extendible portion comprising a sheet folded to form a pleat, the pleat secured with a frangible stitch such that when the stitch breaks the extendible portion extends to an increased surface area condition, a peripheral edge of the extendible portion being reinforced by a stiffening frame.

7. The apparatus according to claim 6 wherein the airbag comprises a main wall fastened along opposite longitudinal edges to a left and a right side wall and at least one tether is connected to the main wall to form a depression in the main wall when the airbag is deployed, and a cover is attached to the main wall and the left and right side walls to cover the depression so as to form a subsidiary chamber, at least a portion of the cover comprising the extendible portion.

8. The apparatus according to claim 7 wherein the subsidiary chamber has at least one subsidiary vent to vent gas from the subsidiary chamber to atmosphere.

9. The apparatus according to claim 6 wherein the extendible portion is located in the region of the airbag where a head of a small statured occupant is expected to impact the bag.

10. An airbag for a motor vehicle comprising:
    a main chamber;
    a subsidiary chamber fluidly connected to the main chamber by at least one transfer vent formed in a common wall between the subsidiary chamber and the main chamber; and
    an extendible portion forming an occupant-facing wall of the subsidiary chamber in a region of the airbag where an occupant head is expected to impact the airbag, the extendible portion extending to an increased surface area condition when subjected to impact, a peripheral edge of the extendible portion being reinforced by a stiffening frame.

11. The apparatus according to claim 10 further comprising at least one tether connected to a wall of the main chamber to form a rearward-facing depression in the wall when the airbag is deployed, and a cover is attached to the wall to cover the depression so as to form the subsidiary chamber, at least a portion of the cover comprising the extendible portion.

12. The apparatus according to claim 10 wherein the subsidiary chamber has at least one subsidiary vent to vent gas from the subsidiary chamber to atmosphere.

13. An airbag for a motor vehicle comprising:
    a main chamber;
    a tether connected to a wall of the main chamber to form a rearward-facing depression in the wall when the airbag is deployed;
    a cover attached to the wall to cover the depression so as to form a subsidiary chamber fluidly connected to the main chamber by at least one transfer vent formed in a common wall between the subsidiary chamber and the main chamber, the cover and the subsidiary chamber being located in a region of the airbag where an occupant head is expected to impact the airbag; and
    at least a portion of the cover comprising an extendible portion that extends to an increased surface area condition when subjected to impact.

14. The apparatus according to claim 13 wherein a peripheral edge of the extendible portion is reinforced by a stiffening frame.

* * * * *